United States Patent [19]
Sayce et al.

[11] Patent Number: 5,985,779
[45] Date of Patent: Nov. 16, 1999

[54] OPAQUE QUARTZ GLASS PRODUCT AND METHOD OF MANUFACTURE

[75] Inventors: Ian George Sayce, Northumberland; Peter John Wells, Tyne and Wear, both of United Kingdom

[73] Assignee: TSL Group PLC, United Kingdom

[21] Appl. No.: 09/125,240

[22] PCT Filed: Feb. 13, 1997

[86] PCT No.: PCT/GB97/00398

§ 371 Date: Aug. 13, 1998

§ 102(e) Date: Aug. 13, 1998

[87] PCT Pub. No.: WO97/30000

PCT Pub. Date: Aug. 21, 1997

[30] Foreign Application Priority Data

Feb. 15, 1996 [GB] United Kingdom .................. 9603128

[51] Int. Cl.⁶ .............................. C03C 3/06; C03C 11/00; C03B 19/08
[52] U.S. Cl. .......................... 501/54; 65/17.3; 65/DIG. 8; 65/17.5; 65/17.4; 65/120
[58] Field of Search .................... 501/54, 32; 65/17.3, 65/17.5, 120, 17.4, DIG. 8, DIG. 9; 428/398, 446

[56] References Cited

U.S. PATENT DOCUMENTS

| | | | |
|---|---|---|---|
| 5,114,881 | 5/1992 | Kaneko et al. | 501/54 |
| 5,497,004 | 3/1996 | Rudolph et al. | |

FOREIGN PATENT DOCUMENTS

| | | |
|---|---|---|
| 647600 A1 | 4/1995 | European Pat. Off. . |
| 4338807 | 1/1995 | Germany . |
| 04065328 | 3/1992 | Japan . |
| 05254882 | 10/1993 | Japan . |
| 07300341 | 11/1995 | Japan . |

*Primary Examiner*—Michael Marcheschi
*Attorney, Agent, or Firm*—Howson and Howson

[57] ABSTRACT

Disclosed is a quartz glass product of enhanced opacity manufactured by fusion of silica particles, the opacity being enhanced by the reaction of an organosilicon additive in the course of the fusion process. A method of enhancing the opacity of a quart glass product by fusing silica particles in the presence of an organosilicon additive is also disclosed.

15 Claims, No Drawings

OPAQUE QUARTZ GLASS PRODUCT AND METHOD OF MANUFACTURE

Fused quartz products are widely used in the semiconductor industry to contain various high temperature processes important in the manufacture of microelectronic components. As the technology has advanced and defect levels have been reduced, there has developed a need for fused quartz glass of exceptional purity, particularly with respect to those metallic species which are potentially mobile at the temperatures of use, notably the alkali metals and copper. Such fused quartz products are achieved by fusing highly refined quartz grain, leading to bubble-free transparent quartz glass products of very high purity, as a consequence of which they exhibit very high transmissivity to both visible and infra-red radiation.

While this transparency presents no disadvantages for many of the fused quartz components used in semiconductor processing, there is a requirement for quartz glass products of comparable purity but which are substantially opaque to infra-red radiation. Such an opaque glass is required for the manufacture of thermal baffles, pedestals, flanges etc., in order to restrict transmission of infra-red radiation from the hot zone to other parts of the furnace, thus facilitating the achievement of uniform temperature in the hot zone, while limiting heat transmission to more delicate parts, e.g., the seals at the demountable joints of the apparatus.

The conventional way of reducing the transparency of vitreous silica, while maintaining its intrinsic purity is by incorporation of microbubbles, which reflect and diffuse the radiation. It is beneficial to have a large number of small bubbles, and desirable that the resultant opaque glass be of relatively high density, preferably above 1.9 g/cc (c.f. fused quartz 2.21 g/cc), and with closed pores, since this facilitates the welding of such articles, aids achievement of maximum cleanliness, ensures that the product is impervious to most gases, and minimises dimensional changes on flame polishing etc. The quartz glass manufacturer is thus confronted with the problem of generating at an acceptable cost, a glass product of high purity, incorporating a high concentration of microbubbles, with a well defined site distribution, the bubbles being preferably of small sizes and large bubbles being absent.

One solution to this problem employs amorphous or sol gel silica powders which are fused or sintered under conditions chosen to retain microbubbles, (e.g., Shinetsu Ref, 1, 2 & 3), Tosch Corporation (Ref. 4), and Nitto Chemical Industry (Ref. 5). These methods require careful control of sintering conditions, but this is not easy for large articles which by their very nature are relatively poor thermal conductors. A variation of this technique involves the incorporation of carbon or graphite particles in the silica gel, as reported by Shinetsu (Ref. 6).

Such methods, based on high surface area synthetic silica powders, lead to intrinsically high cost opaque glass products, and a more practical route to large ingots, flanges and other components would be to employ high purity quartz crystal grain as feedstock. Such high purity feedstocks already exist, and are used to manufacture the transparent fused quartz components which comprise the majority of the fused quartz equipment used in the semiconductor industry. The manufacture of specific components via slip-casting of fused quartz powders is well known, and has been used for many years to make articles which, depending on sintering conditions, can be opaque and of controlled porosity (Georgia Institute of Technology Refs. 7 & 8), or transparent and substantially bubble-free (Sherwood Refractories, Ref. 9). Such methods require the initial fusion of the grain, followed by grinding to fine power, suspension of the fine powder in a carrier medium, casting and sintering, and, while they offer the possibility of a near-net-shape product, without stringent precautions these processes give rise to undesirable pollution of the high purity feedstock material. Nevertheless they form the basis of a range of impervious opaque vitreous silica products sold by the Applicants as "Slipcast Vitreosil"™.

There remain many applications which require small or large articles which may be machined or otherwise formed from ingots or other massive or smaller shapes of opaque fused quartz. What is required is a means of fusing the above high purity crystalline or amorphous feedstocks to form ingot or other products, but to achieve the required opacity by incorporating an appropriate non-contaminating dopant which may generate the required opacity via the generation of microbubbles in the course of the fusion operation.

One proposed method of achieving this end is to mix the feedstock material with an opacity-inducing additive, capable of evolving gas on heating, and to subject the mixture to flame fusion. Thus Nippon Sekiei Garasu KK have proposed the use of powdered silicon nitride as such an additive (Ref. 10). For this method to succeed it would be necessary to obtain the silicon nitride in the form of a very finely divided powder, of controlled particle size and exceptional high purity. Such powders are expensive, and the need to rely on a specific dopant powder also limits the range of bubble size/frequency which can be achieved in the product glass using this method.

We have discovered an alternative class of opacity-inducing additive, by means of which quartz feedstock in grain or powder form may be fused to an opaque quartz glass with no loss in purity; indeed some upgrading of purity may even be achieved. It is also possible to control the bubble frequency and size distribution, by appropriate choice of additive and process conditions.

These results may be achieved by mixing the feedstock material, which may be crystalline or amorphous (e.g., fused quartz) with an appropriate organosilicon compound which may be incorporated in the feedstock as a finely divided solid or as a liquid. If the organosilicon compound is to be used as a finely divided powder, this may be added as a dry powder, or as an emulsion or suspension in an appropriate carrier liquid. If a liquid organosilicon compound is used, it may be applied as a solution in an appropriate solvent, as a suspension in an appropriate carrier liquid, or even added undiluted to the feedstock material, (e.g., quartz powder).

Examples of a solid organosilicon additive available as fine powders include the range of Tospearl™ products sold by Toshiba Silicone Co. Ltd., as non-melting particles of sizes in the range 0.5–12 microns, and which being of pure silicone evolve typically water, carbon monoxide and/or carbon dioxide when heated in oxygen or, at high temperatures, in contact with fused quartz.

Liquid additives may be preferred, since it is easier to generate a homogeneous mixture using such a liquid additive. Many silicone liquids are expected to be suitable for use as additives. Typically what is required is a liquid of sufficiently low vapour pressure, that migration by evaporation is not excessive during the course of fusion of the feedstock. Suitable fluids are conventional silicone oils, typically polydimethylsiloxanes, terminated by trimethylsiloxy groups, available with a wide range of molecular weights and vapour pressures, and also as emulsions in water. One example tested and found to be satisfactory is Silicone Oil 2128, sold by GE Silicones.

While it is thus possible to use silicone oils which do not react with the quartz powder, and preferable to use those with high boiling point, the effectiveness of the additive may be reduced by any evaporation which occurs print to the high temperature pyrolysis, which ideally gives rise to microbubbles of gas during the fusion process.

We have found that a preferred class of additives comprises those liquids which may be caused to react with the silica surface, and thus form an adherent surface coating on the feedstock particles. In this way it is possible to ensure that no significant evaporation occurs during heating of the feedstock grain to fusion temperature, the additive being held at the surface of each feedstock particle as a thin resinous layer until it pyrolyses during the fusion process to form gaseous species, including water, carbon monoxide, and/or carbon dioxide. These generate microbubbles of controlled size, intimately distributed throughout the fused quartz glass. Some additives within the scope of the invention also release other gases (e.g., nitrogen-containing species) during pyrolysis.

Thus while a wide variety of organosilicon compounds may be employed as additives, a preferred class comprises liquid organosilicon compounds which may be applied to the surface of quartz grain, and which react to bond adhesively to the surface.

A large number of organosilane coupling agents exist, capable of bonding to various substrates, and many of these can be used in carrying out the invention. Agents which bond to silica surfaces generally do so by a hydrolytic process. Thus a typical compound $R^1R^2R^3SiX$, where X is a hydrolysable substituent, may be caused to react with □Si—OH on the silica surface to form a bond $R^1R^2R^3Si$—O—Si≡.

Such reagents are widely used, for example, to form a water-repellent layer on glass, to aid the free-flow of powders etc., and the most common substituents X are alkoxy, acyloxy, amine, hydrogen or chlorine. The substituent is released (as alcohol, ammonia, hydrogen etc.). Generally a chlorine-free coupling agent is preferred, since the chlorosilanes evolve HCl, which can present handling difficulties.

More generally some of the potential types of organosilicon compound which can be used in this invention are listed below, with examples of each type.

| Silane Coupling Agents | Examples |
| --- | --- |
| acyloxysilane | Acetoxypropyltrirmethoxysilane |
| alkanolamine | (2-Hydroxyethyl)-3-aminopropyl-triethoxysilane |
| alkoxysilane | Trimethylmethoxysilane |
| amine | N-Methylaminopropyltrimethoxysilane |
| aromnatic | Phenyltriethoxysilane |
| chloroalkyl | 3-Chloropropyltrimethoxysilane |
| chloromethylaromatic | 1-Trimethoxysilyl-2(p,m-chloromethyl)-phenylethane |
| chlorosilane | (3-Phenylpropyl)Dimethylchlorosilane |
| epoxy | 3-Glycidoxypropyltrimethoxysilane |
| hydrogen | Polymethylhydrogensiloxane |
| isocyanate | 3-Isocyanatopropyltriethoxysilane |
| mercapto | 3-Mercaptopropyltrimethoxysilane |
| methacrylate | 3-Methacryloxypropyltrimethoxysilane |
| silanol | Polydimethylsiloxane, silanol terminated |
| silazane | Hexamethyldisilazane |
| styryl | 3-(N-Styrylmethyl-2-amino-ethylamino)propyltrimethoxysilane hydrochloride |
| vinyl | Vinyltriacetoxysilane |

This range of potential coupling agents may be further extended by substitution and/or polymerisation. Thus there is an extensive range of compounds available for use in the method of the invention, with a wide choice of molecular weights and gas-forming potential.

Depending on the chosen compound, there is also a choice of mode of application to the feedstock material. Thus it may be mixed in bulk (e.g., by spraying on the powder and then tumbling to aid homogenisation), it can be applied from solution (e.g., in water or alcohol) or by other means. We have found it most convenient to use a reagent of relatively high molecular weight, and suitable for bulk mixing, since this avoids the necessity of removing a solvent after coating. The technique is demonstrated in the examples below, employing a polymethylhydrogen siloxane, e.g., DC1107, from Dow Corning. This is a pure liquid, supplied for coating glass, paper etc., to provide water-repellent properties, and also used as a treatment for powders and granular materials to render them water-repellent, and to improve flow characteristics. The invention is however not limited to the use of such a compound and a wide range of alternative organosilicon additives is also applicable.

For some purposes it may be advantageous to add a quantity of a secondary additive, in the form of an appropriate high purity ultrafine powder, for example silica, silicon carbide, silicon nitride, or carbon. Alternatively, it may be preferably to generate an increased degree of opacity by reducing the mean particle size (e.g., by ball-milling, preferably with high purity quartz balls), by increasing the surface area of the feedstock material (e.g., by high temperature treatment, and/or acid etching), or by addition of a finely divided silica of high surface area. Thus a fumed silica such as Aerosil™ from Degussa AG may be incorporated in the mixture before fusion, since this will combine with any excess liquid additive, and further improve the opacity of the fused product. It may also be advantageous to heat the feedstock plus additive mixture to effect curing and cross-linking of the coupling agent prior to fusion.

Quartz crystal powders and fused quartz or vitreous silica particles coated according to the present invention may be fused to opaque glass products by any appropriate prior art method such as is already employed for the fusion of opaque vitreous silica, or transparent or opaque fused quartz articles. These methods include flame fusion, and electrically heated fusion processes. Generally the choice depends on the available plant, the purity required and in particular the water (OH) content which is acceptable.

It is preferable to employ a fusion method which operates near atmospheric pressure (or above) or, if using a process operating below atmospheric pressure to allow the bubbles to equilibrate to a pressure near (or above) atmospheric pressure at high temperature (for example above the softening point of the glass), since otherwise, if the microbubbles are equilibrated at pressures substantially below atmospheric, the bubble size distribution and density of the product glass will be sub-optimal.

To date there odes not appear to be any standard method of measuring or reporting the transmission of opaque vitreous silica products, and figures previously reported often refer to articles of intermediate surface finish, achieved for example by cutting or grinding. Such surfaces will lead to significant reflection losses, and it is probable that the transmission figures reported by previous workers are thus not a true indication of the internal transmissivity of the glass.

We have developed two alternative techniques for measuring transmissivity. In the first of these, a sample is prepared as a wafer approximately 1 mm thick, and polished by conventional means, to a surface finish which for an optical glass would correspond to transparency. Polishing is followed by cleaning in an ultrasonic bath, and the IR transmission of the sample is then measured.

This method yields transmissivities comparable to the second method, which is more convenient. In this second method the sample wafer is prepared by cutting and grinding, is thoroughly cleaned in an ultrasonic bath, and is then sandwiched with index-matching fluid (e.g., cineole) between fused quartz optical flats. This method is clearly only suitable for closed-pore opaque vitreous silicas, but these are preferred products of the present invention.

Both methods of measurement give transmissivities significantly higher than those obtained using earlier methods of measurement, which take no account of surface reflection. However our results are more reproducible, and thus, we believe, are more relevant than those obtained by previous methods.

The transmission data reported below are thus internal transmissivity figures, obtained using the second method noted above.

Preferred products of the invention are of high purity, and high density, and they therefore exhibit most properties typical of fused quartz articles, namely low expansion coefficient, good thermal shock resistance, and resistance to high temperatures. The uniform distribution of closed micro-pores means that articles made from products of the invention are impervious to most gases even at thickness 1 mm or less, and are readily cleaned, e.g., via acid etching, or ultrasonic cleaning, and joined to other components, e.g., via welding.

EXAMPLE 1

Flame Fusion, Reactive Liquid Dopant 50 kg of quartz crystal grain A, chemical analysis shown in Table 1, was mixed with 250 g (i.e., 0.5% by weight) of polymethylhydrogen siloxane, DC1107 from Dow Corning, and tumbled in a polypropylene vessel for 1 hour, to homogenise the mixture.

The product was a free-flowing powder, which was fused at 1960° C. in a tank made from pressed zircon refractory bricks by feeding at 3 kg/h through the centre of an oxyhydrogen burner made from quartz glass. On cooling, the product was an opaque white block of glass, whose properties are listed in Table 1.

The purity of the fused product closely matches that expected from the specified purity of the feedstock quartz grain (see Table 1) and no significant contamination has resulted from the doping process.

The infra-red transmission at 900 nm, and at 2400 nm (peak of emission of a black-body radiator at 1000° C.), was measured using an infra-red spectrophotometer, using specimens cut from the glass block, ground to 1 mm thickness, and ultrasonically cleaned. The internal transmissivity (allowing for reflection losses) was 16% at 900 nm, and 7% at 2400 nm, showing that the glass was substantially opaque at these wavelengths.

EXAMPLE 2

Flame Fusion, Reactive Liquid Dopant, High Purity Crystal

The conditions of Example 1 were repeated, except that the feedstock was replaced with a high purity, low alkali quartz crystal grain B, doped with 0.5% by weight DC1107. The properties of the resulting opaque quartz glass are as shown in Table 1.

Again the purity of the product closely matches that of the high purity feedstock. The internal transmissivity measured as in Example 1, was 10% at 900 nm, and 5% at 2400 nm, showing that the glass was substantially opaque at these wavelengths.

EXAMPLE 3

Electrically Heated Fusion, Solid Silicone Additive 20 kg of quartz crystal grain C (Analysis in Table 1, was mixed with 0.6 g (i.e., 30 ppM by weight) of polymethylsilsequioxane spherical fine powder, Tospearl 145A™, average particle size 4 microns, from Toshiba Silicone Co. Ltd., and tumbled in a silica glass vessel to homogenise the mixture.

The product was a free-flowing powder which was loaded into a small rotary kiln, length 900 mm, internal diameter 140 mm, heated by a graphite electrode of diameter 20 mm on the axis of the furnace. The powder was held on the furnace wall by the centrifugal action resulting from rotation of the furnace. The furnace was heated for 2 minutes at 50 kW, followed by 15 minutes at 30 kW, and then allowed to cool.

The product was an opaque fused quartz tube of internal diameter 50 mm, wall thickness 10 mm, whose other properties are summarised in Table 1. By increasing the level of additive it was possible to reduce the transmissivity, at the expense of a minor reduction in bulk density.

EXAMPLE 4

Electrically Heated Fusion, Non-Reactive Liquid Silicone Additive

The condition of Example 3 was repeated except that the additive was replaced by 50 g (i.e., 0.25%) of silicone emulsion SM2118 from GE Silicones. The product was an opaque fused quartz tube of internal diameter 40 mm, and wall thickness 10 mm, whose other properties are shown in Table 1.

These Examples illustrate the potential of the invention, which can be applied to both electric and flame-fused products. In principle either heat source may be used, and each may be employed in a variety of configurations known to the art, e.g. free build-up, in a crucible or tank, with or without continuous drawing etc., Arc or plasma methods may be employed if required. Obviously, if the product is required to have a low hydroxyl (OH) content, then an electrical fusion process will be preferred.

Again the above examples illustrate the manufacture of opaque glass in the form of a block, ingot or tube. Such products may be converted by known art methods to a range of desired articles including rods and tubes, places, flanges and other products. Alternatively, by employing other fusion methods, the invention may be applied to the continuous flame or electric fusion of rod, tube, shaped ingot, e.g., hollow forms, plate products, as well as other shapes if required, and articles manufactured therefrom.

The process of the invention has proved useful in other applications, unrelated to the semiconductor industry. Thus the technique may be employed to provide opacity in a fused quartz or fused silica tube, for cosmetic or other purposes, when used as an envelope in a lighting or heating application. It is possible to transform a tube which would otherwise be transparent or translucent (and for example of a silver- grey colour), into a white opaque product capable of diffusing the direct radiation from a heated metal filament contained therein.

Again at higher levels of additive, it is possible to manufacture tubular products with a significantly reduced bulk density, and controlled level of bubbles. This reduces the strength of the tube in a controlled fashion, and increases the frangibility. Such a tube has proved valuable as an easily removed core tube, replacing a cylindrical sand-resin core in the foundry industry. Thus a vitreous silica tube of reduced bulk density, and increased frangibility, made according to the process of the invention, may be employed as a core tube in the manufacture of a cast iron product, e.g., a hollow camshaft for an internal combustion engine. After cooling the casting, the silica core tube may be removed by pressing, or drilling, the mechanical removal being greatly facilitated as a result of the reduced strength of the glass.

REFERENCES

1. Manufacture of Foamed Opaque Quartz Glass Fujincki, A.,et al Shinetsu KK, Japan JP 95 69661
2. Manufacture of Opaque Quartz Glass with High-Density Fine Pores Sato,T.,et al Shinetsu KK, Japan JP 95 69674
3. Manufacture of Opaque Quartz Glass with Good Heat-Shielding Property Funinoki,A.,et al Shientsu KK, Japan JP 95 61839
4. High-Purity, Opaque Quartz Glass, Method for Producing Same and Use Thereof Kamo,Kenji. Tosch Corporation, Japan EP 0647600 1994
5. High-Purity Opaque Quartz Glass and its Production Orii,X. Nitto Chemical Industry, Japan JP 94 24771
6. Manufacture of Powder Materials for Manufacture of Heat-Resistant Quartz Glass Yamazaki,Y.,et al Shinetsu KK, Japan JP 93 193977
7. Slip Casting of Fused Silica, J. D. Fleming, Ceramic Bull 40 (12) 1961, pp 748–750
8. Slip-Cast Fused Silica Walton J. D. and Poulos N. E. Special Report No. 43, 1964 Engineering Experimental Station Georgia Institute of Technology Atlanta Ga.
9. Process for Making Transparent Silica Glass Loxley, T. A. et al Sherwood Refractories Inc U.S. Pat. No. 3,837,825 1974
10. Manufacture of Opaque Quartz Glass Using Silicon Nitride as a Foaming Agent Sasaki,M Nippon Sekiei Garasu KK, Japan JP 92 65328

TABLE 1

Experimental Results
Analytical data in ppM

| ELEMENT | Example 1 Flame Fusion Powder A | | Example 2 Flame Fusion Powder B | | Example 3 Electric Fusion Powder C | | Example 4 Electric Fusion Powder C | |
|---|---|---|---|---|---|---|---|---|
| | Initial Analysis | Ingot Doped with 0.5% DC1107 | Initial Analysis | Ingot Doped with 0.5% DC1107 | Initial Analysis | Tube Doped with 0.03 TOS 145 | Initial Analysis | Tube Doped with 0.25 GE 2128 |
| Al | 13.9 | 14.96 | 7.97 | 7.97 | 16.97 | 15.3 | 16.97 | 19.1 |
| Ca | 0.4 | 0.85 | 0.28 | 0.55 | 0.46 | 3.7* | 0.46 | 7.4* |
| Cu | 0.02 | 0.01 | 0.04 | 0.01 | 0.09 | <0.03 | 0.09 | 0.05 |
| Fe | 0.3 | 0.47 | 0.18 | 0.13 | 0.37 | 7.4* | 0.37 | 5.3* |
| K | 0.7 | 0.56 | 0.06 | 0.05 | 0.69 | 1.4* | 0.69 | 1 |
| Li | 0.5 | 0.24 | 0.25 | 0.17 | 0.6 | 0.3 | 0.6 | 0.4 |
| Mn | 0.03 | 0.06 | <0.01 | <0.01 | | | | |
| Na | 0.8 | 0.7 | 0.1 | 0.1 | 0.89 | 1.1 | 0.89 | 1.1 |
| Ti | 1 | 1.02 | 1.45 | 1.45 | 1.04 | 1.0 | 1.04 | 1.5 |
| Zr | 0.8 | 1.37 | <0.01 | 0.29 | | | | |
| OH | | 236 | | 227 | | | | |
| Internal Transmissivity | | | | | | | | |
| @ 900 nm (%) | | 16 | | 10 | | 27 | | 4 |
| @ 2400 nm (%) | | 7 | | 5 | | 24 | | 4 |
| Bulk Density (g/cc) | | 2.00 | | 1.91 | | 2.13 | | 1.52 |
| Bubble Count | | | | | | | | |
| No./cc × 10^5 | 2.8 | 2.3 | | | | | | |
| Size Range (microns) | | 7–120 | | 5–200 | | | | |
| Mean Dia. (calc'd) | | 84 | | 101 | | | | |

*Some contamination during trial

What is claimed is:
1. A mixture which produces an opaque quartz glass upon fusion, wherein said mixture comprises silica particles and an organosilicon compound.
2. A mixture according to claim 1, wherein said organosilicon compound is a liquid at room temperature.
3. A mixture according to claim 2, wherein said organosilicon compound forms a chemically bonded layer on surfaces of said silica particles.
4. A mixture according to claim 1 wherein the organosilicon compound is an ultrafine powder uniformly mixed with the silica particles.
5. A mixture according to claim 1 in which the silica particles are derived from quartz crystal grains.
6. A mixture according to claim 1 in which the silica particles are amorphous silica particles.
7. A mixture according to claim 1, wherein the mixture further comprises an ultrafine inorganic powder.
8. A mixture according to claim 7, wherein said ultrafine inorganic powder is an amorphous silica powder.
9. A method of enhancing the opacity of a quartz glass product by fusing silica particles in the presence of an opacity-enhancing additive, wherein the additive is an organosilicon compound.

10. A method according to claim 9, wherein said additive is an organosilicon compound which is a liquid at room temperature.

11. A method according to claim 10, wherein said organosilicon compound forms a chemically bonded layer on surfaces of said silica particles.

12. A method according to claim 9, wherein the silica particles to be fused are derived from quartz crystal grains.

13. A method according to claim 9, wherein the opacity is further enhanced by incorporation of a second additive in the form of an ultrafine inorganic powder.

14. A method according to claim 13, wherein said ultrafine inorganic powder is an amorphous silica powder.

15. A method of manufacturing a quartz glass article selected from the group consisting of an ingot, a plate, a disk, a rod, a tube, a crucible, and a flange, wherein the opacity of the glass is enhanced by a method according to claim 9.

* * * * *

UNITED STATES PATENT AND TRADEMARK OFFICE
CERTIFICATE OF CORRECTION

PATENT NO. : 5,985,779
DATED : November 16, 1999
INVENTOR(S) : Ian George Sayce, et. al.

It is certified that error appears in the above-identified patent and that said Letters Patent is hereby corrected as shown below:

Col. 1, line 41, replace "site" with -- size --.

Col. 3, line 4, replace "print" with -- prior --.

Col. 3, line 32, replace "☐Si-OH" with -- ≡Si-OH --.

Col. 4, line 24, replace "preferably" with -- preferable --.

Col. 4, line 54, replace "odes" with -- does --.

Col. 6, line 36, replace "SM2118" with -- SM2128 --.

Col. 6, line 52, replace "places" with -- plates --.

Col. 7/8, in Table 1, in the first column at "No./cc x $10^{-5}$", move "2.8" under second column of Example 1 and move "2.3" under second column of Example 2.

Signed and Sealed this

Twenty-fifth Day of July, 2000

Attest:

Attesting Officer

Q. TODD DICKINSON
Director of Patents and Trademarks